United States Patent
Kia et al.

(10) Patent No.: US 7,720,208 B1
(45) Date of Patent: *May 18, 2010

(54) METHOD AND APPARATUS FOR AUTHORIZATION BASED PHONE CALLS IN PACKET SWITCHED NETWORKS

(75) Inventors: Azita E. Kia, Santa Barbara, CA (US); Cary FitzGerald, Pleasanton, CA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1413 days.

This patent is subject to a terminal disclaimer.

(21) Appl. No.: 10/123,603

(22) Filed: Apr. 15, 2002

Related U.S. Application Data

(63) Continuation of application No. 09/333,779, filed on Jun. 15, 1999, now Pat. No. 6,404,870.

(60) Provisional application No. 60/100,208, filed on Sep. 14, 1998.

(51) Int. Cl.
*H04M 17/00* (2006.01)
*H04M 15/00* (2006.01)

(52) U.S. Cl. .................. 379/144.01; 379/114.15; 379/114.17; 379/114.2

(58) Field of Classification Search ............ 379/114.01, 379/114.15, 114.16, 114.17, 114.19, 114.2, 379/144.01; 370/252, 356; 455/405, 406, 455/407, 408

See application file for complete search history.

(56) References Cited

U.S. PATENT DOCUMENTS

| | | | | |
|---|---|---|---|---|
| 5,701,301 A | * | 12/1997 | Weisser, Jr. | 370/428 |
| 5,793,771 A | * | 8/1998 | Darland et al. | 370/467 |
| 5,825,857 A | * | 10/1998 | Reto et al. | 379/114 |
| 5,956,391 A | * | 9/1999 | Melen et al. | 379/114 |
| 5,960,416 A | * | 9/1999 | Block | 705/34 |
| 5,995,822 A | * | 11/1999 | Smith et al. | 455/406 |
| 6,064,653 A | * | 5/2000 | Farris | 370/352 |
| 6,078,582 A | * | 6/2000 | Curry et al. | 370/356 |
| 6,097,804 A | * | 8/2000 | Gilbert et al. | 370/352 |
| 6,104,704 A | * | 8/2000 | Buhler et al. | 370/252 |
| 6,122,364 A | * | 9/2000 | Petrunka et al. | 379/265 |
| 6,125,177 A | * | 9/2000 | Whittaker | 379/243 |
| 6,137,869 A | * | 10/2000 | Voit et al. | 379/114 |
| 6,160,874 A | * | 12/2000 | Dickerman et al. | 379/114.19 |
| 6,377,938 B1 | * | 4/2002 | Block et al. | 379/114.03 |
| 6,404,870 B1 | * | 6/2002 | Kia et al. | 379/144.01 |

* cited by examiner

*Primary Examiner*—Quoc D Tran
(74) *Attorney, Agent, or Firm*—Stolowitz Ford Cowger LLP

(57) ABSTRACT

A call authorization system moves state maintenance for authorization based phone calls from a central authorization server to different gateways in a packet switched network. A simple authorization session protocol is used between the authorization server and the gateways to minimize network traffic. The authorization session protocol releases the authorization server from having to maintain states for open authorization based phone calls.

35 Claims, 6 Drawing Sheets

METHOD AND APPARATUS FOR AUTHORIZATION BASED PHONE CALLS IN PACKET SWITCHED NETWORKS

This application is a continuation of prior U.S. Ser. No. 09/333,779, filed Jun. 15, 1999, which claims priority from prior U.S. Provisional Ser. No. 60/100,208, filed Sep. 14, 1998.

FIELD OF THE INVENTION

This present invention relates generally to systems for supporting authorization based phone calls, and more particularly to a distributed authorization based phone call system used in Voice Over IP networks.

BACKGROUND OF THE INVENTION

Packet switched networks route voice traffic using a Voice Over Internet Protocol (VoIP). VoIP allows telephone calls to be carried over an Internet Protocol (IP) network between two telephones or computers.

Authorization systems verify user authorization to particular phone services before allowing the phone network to connect the call. The authorization system usually exchanges certain parameters between a Network Access Server (NAS) that receives inputs from a user and an authorization server that has access to a user database containing authorization information for valid users.

Credit based authorization is one type of authorization based phone call. With credit based authorization, the user sets up a debit account with a telephone company prior to making phone calls. The debit account often takes the form of a preapproved calling card. When the user wishes to make a phone call, the authorization system verifies that the user has sufficient credit on the calling card account before connecting the phone call. As the call continues, the authorization system continuously tracks the cost of additional time of the call and subtracts the additional cost from the remaining credit in the calling card account. The authorization system notifies the user when the credit limit is about to run out on the calling card. If the user continues to talk past the remaining credit limit, the authorization system terminates the phone call.

In VoIP networks, a call is established through the packet switched network via a local gateway. A central authorization server in another part of the network tracks state information regarding the authorization based call. State information includes account identification information associated with the call, the rate for the current call, the elapsed time of the current call, the amount of credit remaining on the prepaid calling card, etc.

The authorization server keeps state information for all open authorization based calls that go through the same authorization system. This centralized authorization system does not scale well. This is because all open authorization based calls are managed by the same authorization server. There is also a reliability (robustness) problem with a centralized authorization server. If the authorization server crashes, all open authorization based calls could be disconnected. State information for all the open authorization based calls can also be lost when the authorization server crashes, creating accounting errors.

Another problem exists with tracking authorization based call states from a central authorization server. The gateways that establish the call connections between two different endpoints are typically not prepared to respond to signals sent asynchronously from the authorization server. Thus, if the authorization server identifies a call exceeding a user's credit authorization, the gateway may not be able to disconnect the call in a timely manner.

Thus, the need remains for improving the scalability and reliability of authorization based telephone systems.

SUMMARY OF THE INVENTION

A call authorization system moves authorization based state maintenance from a central authorization server to multiple gateways in a packet switched network. A simple authorization session protocol is used between the authorization server and the gateways that minimizes network traffic and also releases the authorization server from maintaining call states for open authorization based phone calls.

The gateway receives an account identifier and an authorization request for establishing a phone call with an endpoint in the packet-switched network. The gateway includes a machine-accessible medium having associated data that, when accessed, cause the gateway to send an authorization request message to the authorization server including the account identifier and the authorization request. The authorization server uses the account identifier as an index for matching a user record in a user database.

The authorization server sends back a response message accepting the authorization request if a user record verifies the authorization request. The gateway connects the call when the authorization request is accepted and then maintains call authorization states for the connected call. If the authorization request is rejected by the authorization server, the gateway terminates the authorization request.

Scaling of the authorization system is improved since the authorization server is freed from maintaining call states for all open authorization based calls. Robustness is also improved because the authorization server can crash and come back up during a credit based call without disconnecting or losing call state information for open calls. Because call state maintenance is distributed to multiple gateways, any one gateway can crash, and not affect credit based calls established through other gateways.

The authorization session between the authorization server and the gateway is used for a variety of different types of authorization based phone calls. For example, the invention is used for credit based call authorization such as required for prepaid calling cards. The invention allows the gateway to effectively "escrow" funds from the user account while the call is in progress, with a timer ticking down the escrow amount. The authorization server takes the entire escrowed amount out of the user's debit account. If the call terminates before the escrowed amount held at the gateway is used up, the remaining escrowed amount is "re-credited" to the user's account maintained by the authorization server. Thus, instead of maintaining and conducting all authorization state processing in the authorization server, the escrowed amount is held and maintained by the gateway and returned to the authorization server at the end of the call.

The invention is also used for destination based call authorization where a particular call account is authorized to make calls only to prespecified phone numbers. In another application, the authorization session is used for class of service based call or quality of service authorization where call accounts are authorized for particular call services, such as video conference calls.

The foregoing and other objects, features and advantages of the invention will become more readily apparent from the

DETAILED DESCRIPTION OF THE INVENTION

Figure 1:
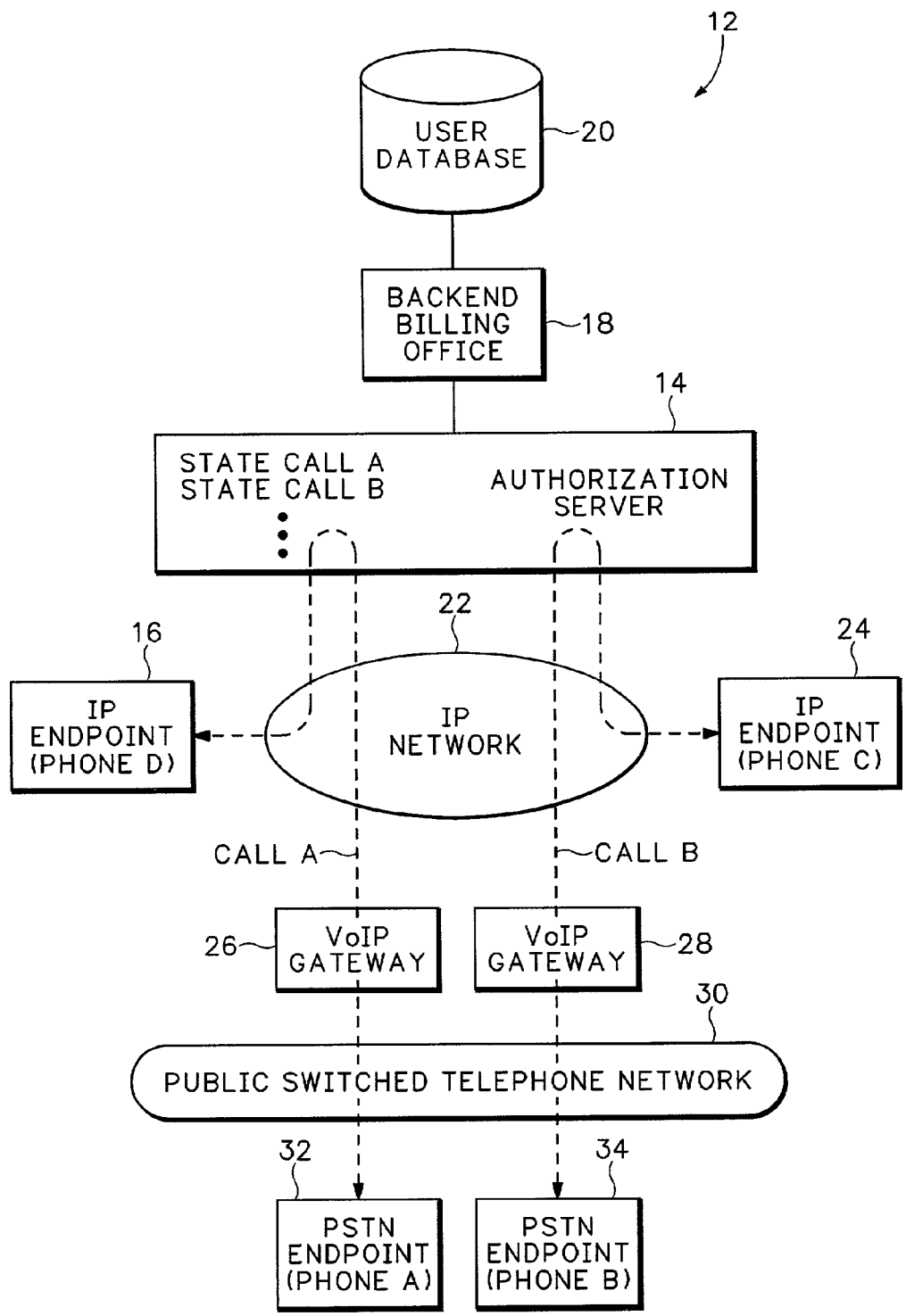
FIG. 1 is a functional block diagram illustrating a prior art VoIP system.

FIG. 1 is a functional block diagram of a VoIP network 12. The network 12 includes an Internet Protocol (IP) network 22 connected to gateways 26 and 28, an authorization server 14 and IP endpoints 16 and 24. Gateways 26 and 28 provide VoIP access between IP network 22 and a Public Switched Telephone Network (PSTN) 30. Authorization server 14 is connected to a backend billing system 18 that accesses a user database 20.

PSTN 30 is connected to several PSTN endpoints, such as endpoints 32 and 34 which are standard circuit switched telephones. Phones 32 and 34 access one another through PSTN 30 and to endpoints 16 and 24 through gateways 26 and 28 and IP network 22. IP endpoints 16 and 24 are IP phones with VoIP service.

VoIP services are accessed from the phones 32 and 34 via PSTN 30 or directly through the IP network 22 by IP phones 16 and 24. In the first case a phone connection involves dialing into an incoming gateway. In both the PSTN and IP Phone cases a connection involves a terminating gateway that eventually connects to a destination telephone.

FIG. 1 shows how a credit based phone call was authorized in earlier VoIP systems. Credit based calls, such as call A and call B, would first have to be switched through the authorization server 14. The authorization server 14 would then maintain call states for both call A and call B during the duration of the call. Maintaining these call states comprised, among other things, identifying a specific account for the call, the destination for the call, the rate for the call and the duration of the call.

As mentioned above, this centralized authorization system does not scale well because the authorization server 14 must manage states for all open authorization based calls in the packet switched network 22. There is also a reliability (robustness) problem. If the authorization server 14 crashes, state information for all open authorization based calls (call A and call B) is lost and the call charges are not debited correctly to the appropriate call account.

Figure 2:
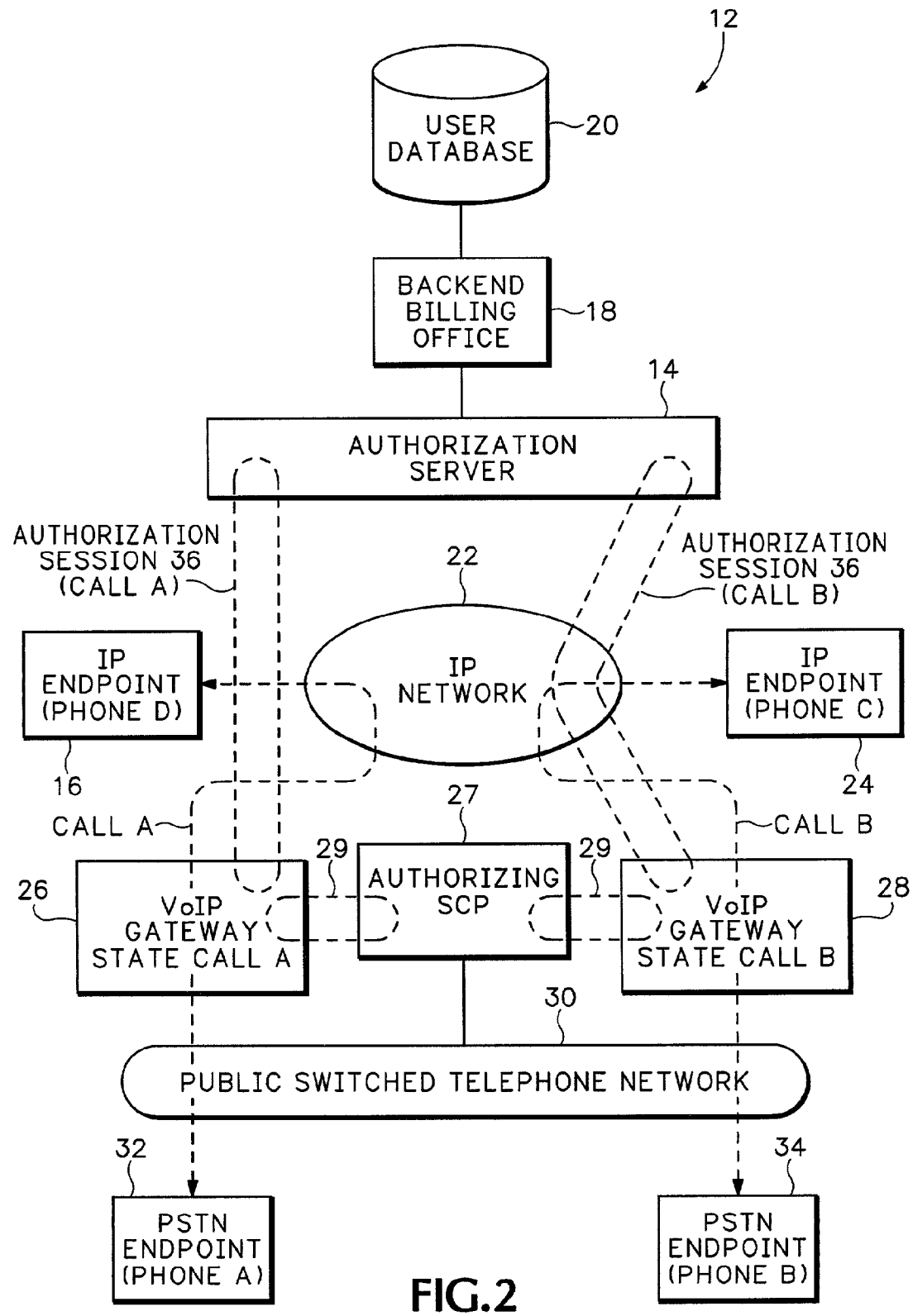
FIG. 2 is a functional block diagram of the VoIP system shown in FIG. 1 including an authorization system according to the present invention.

Referring to FIG. 2, the present invention moves call state management for the authorization based calls from the central authorization server 14 to the local gateways 26 and 28. The gateways 26 and 28 communicate with the authorization server 14 through authorization sessions 36. There are several protocols that can be used for conducting the authorization session 36, such as RADIUS or DIAMETER. Service Control Points (SCPs) 27 from the circuit switched telephone network 30 can also conduct authorization sessions 29 for call authorization.

The accounting system residing in backend billing office 18 supports call accounting and permits two way communication with gateways 26 and 28 to allow queries for user authorization information, such as credit, destination and class of service. The accounting system also allows accounting messages to be reported in the middle of calls in addition to connect and disconnect times. This is useful in measuring long duration calls where is it desirable to update the credit value for the user in database 20 at intervals during the call. The accounting system supports multiple existing accounting message formats such as Automatic Message Accounting (AMA).

When a user at one of the phones 16, 24, 32 or 34 attempts to make a authorization based VoIP call, such as a credit based call, the telephone connects to one of the VoIP gateways in the network 12. For purposes of example, assume that telephone 32 accesses gateway 26 in order to make a VoIP call to phone 16.

Instead of routing the call through the authorization server 14 for authorization and call state management, the gateway 26 collects account information such as account identification (ACCT ID) and a password/personal identification number (PIN). The account information is obtained from a user by the gateway 26 through an interface such as an Integrated Voice Response (IVR) application. The IVR application generates the voice prompts and retrieves the Dual Tone Multiple Frequency (DTMF) signals used by the gateway 26 to collect the account and call request information. IVR applications are known to those skilled in the art and are therefore not described in further detail.

The user ACCT ID and PIN information collected by the IVR application in the gateway 26 is sent to authorization server 14 during the authorization session 36. The authorization server 14 checks the user ACCT ID and PIN against information in the user database 20 in order to authenticate the user call request. Success or failure of the authorization check is reported back in a response message from the authorization server 14 to the gateway 26.

It is important to emphasize that the authorization server 14 does not maintain call states. In other words, the authorization server 14 no longer is required to continually track information, such as account information call duration and call destination for open calls in the IP network 22. The authorization server 14 only has to verify authorization requests and then send back response messages either accepting or rejecting the authorization request. The gateway 26 then controls when any further processing is required for that call by sending another request.

Figure 3:
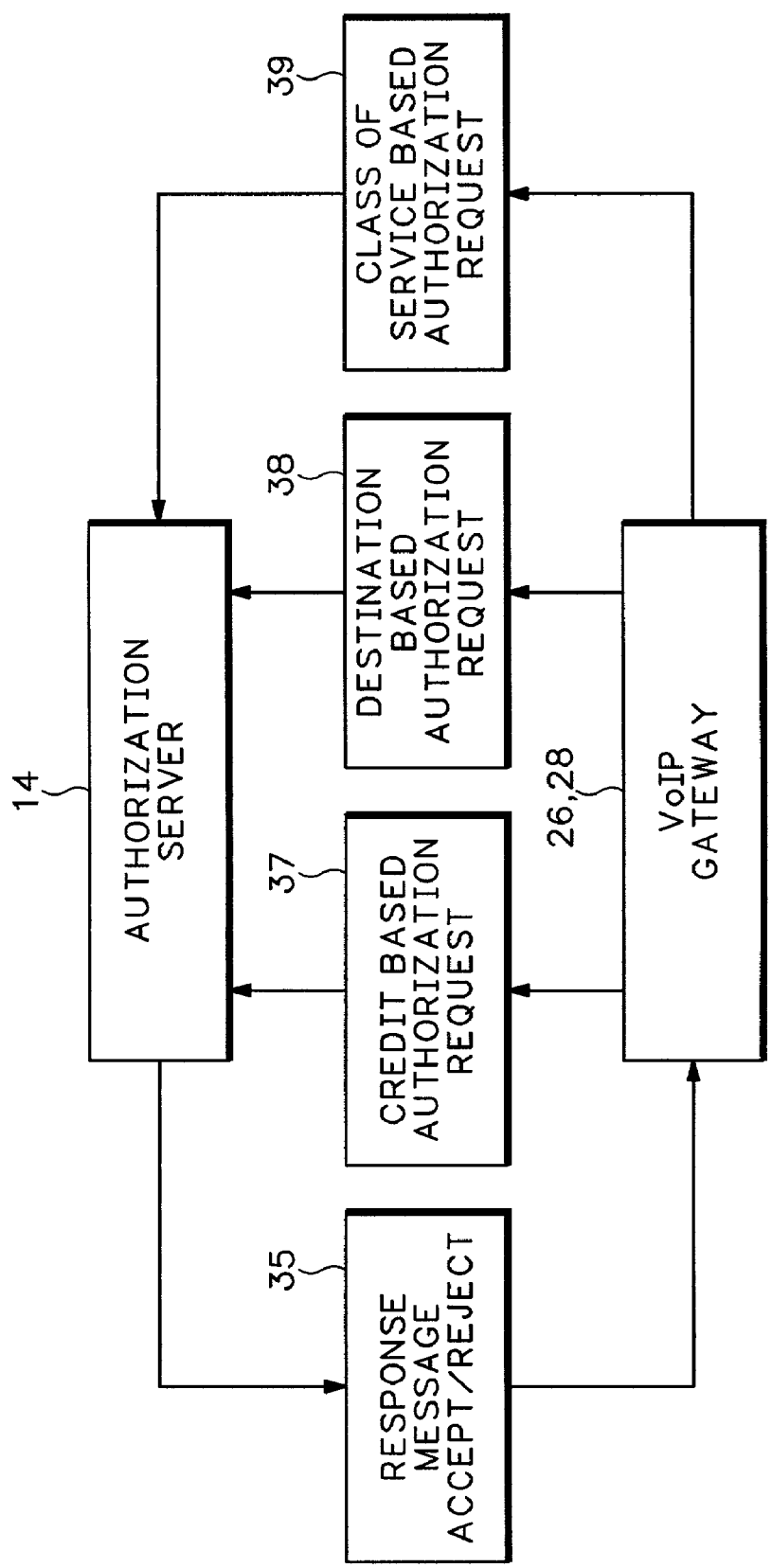
FIG. 3 is a block diagram showing different types of authorization based phone calls supported by the authorization system shown in FIG. 2.

FIG. 3 shows different types of authorization based calls that are supported by the authorization system. A credit based authorization request 37 is used for credit based calls such as those made with prepaid calling cards. A destination based authorization request 38 is used when authorization is based on a particular source or destination of the call such as when a particular call account is only authorized to make calls to prespecified phone numbers. A class of service based authorization request 39 is used to authorize particular call services, such as video conference calls. The authorization server 14 sends back a response message 35 that either accepts or rejects the authorization request 37, 38, or 39. Credit based authorization, destination based authorization and class of service based authorization are discussed in further detail below.

Figure 4:
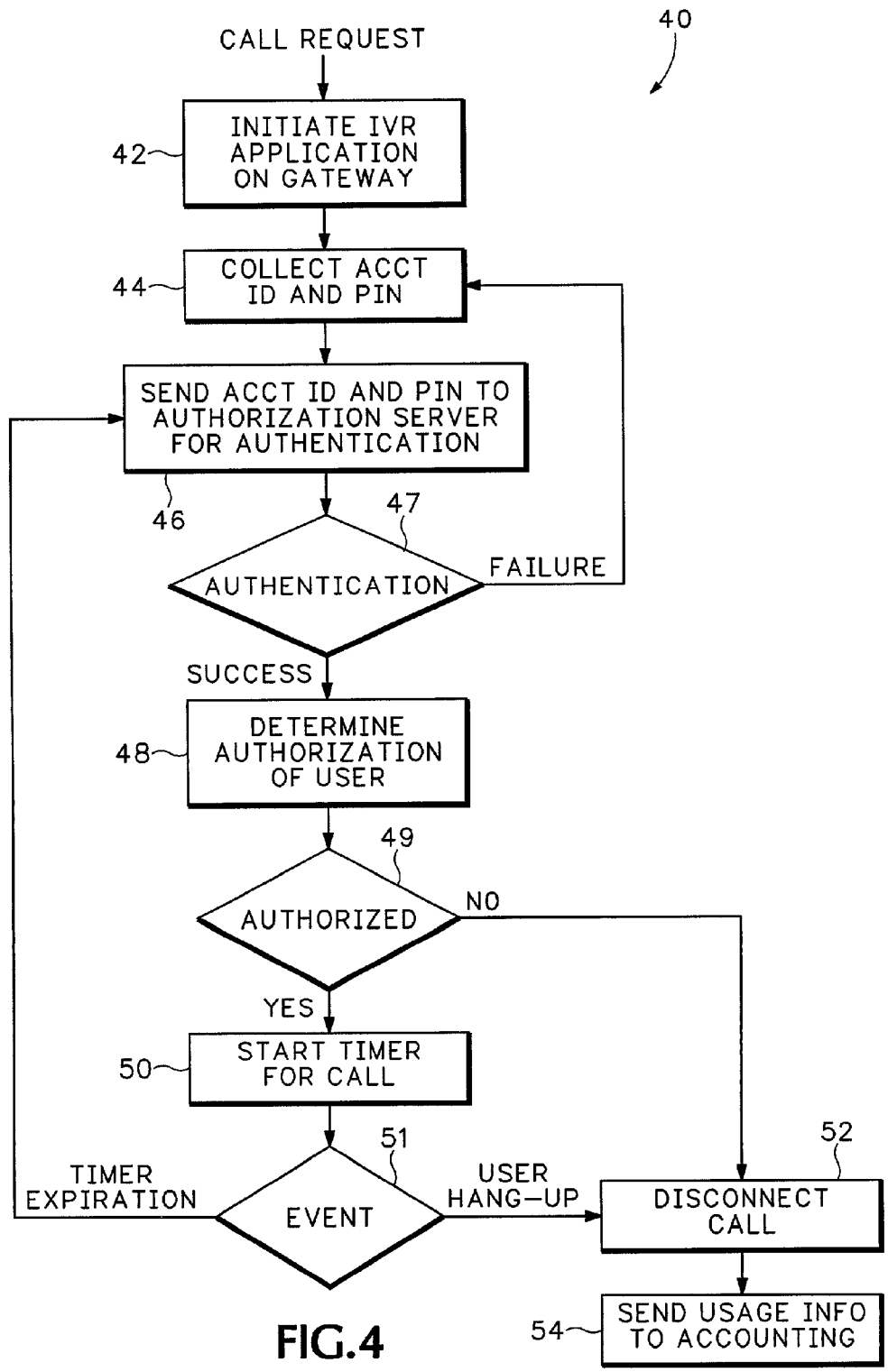
FIG. 4 is a flow diagram showing how a gateway in FIG. 2 conducts an authorization session according to the present invention.

FIG. 4 shows a flow diagram of a process 40 that executes within gateway 26 or 28 during the authorization session 36. For simplicity, the process 40 is described below with respect to gateway 26. However, the process is applicable to any gateway in the VoIP network 12 that receives an authorization request from a user.

When a call request is received, the gateway 26 in step 42, initiates the IVR application to interface with the user. The IVR application in gateway 26 collects the user's ACCT ID and PIN information in step 44 by prompting the user and then monitoring the user responses. Gateway 26 sends the ACCT ID and PIN to authorization server 14 in step 46 for authentication.

In step 47, gateway 26 waits for the response from authorization server 14. The authorization server 14 uses the ACCT ID and PIN to authenticate the call in the user database 20 through backend billing office 18 (FIG. 2). If authentication fails in step 47 due to a bad PIN, bad ACCT ID, or a protocol error, control flow returns to step 44. The IVR application then prompts and collects the user information again. If the authorization server 14 is successful in authenticating the authorization information in user database 20, control flow proceeds to step 48 to verify user authorization.

If the user is authorized for the requested type of call, control branches at step 49 to step 50 where a timer is started. The timer keeps track of the call duration for accounting purposes. If the user is not authorized in step 49, then control branches to step 52 and the call is disconnected.

Once the timer is started at step 50, gateway 26 waits for the timer to expire or for the user to hang-up. If the timer expires, control branches at step 51 back to step 46 to determine if the user is authorized to continue the call past the currently authorized time period. The user account information may have been updated since the timer originally started. For example, credit for additional time may have been added to user account.

If the user hangs-up, control branches at step 51 to step 52 where the gateway 26 terminates the connection with the user and releases the connection resources. The gateway then sends an accounting message at step 54 to the authorization server 14 including the usage information for the call. The usage information is forwarded to the backend billing office 18 where the user account information is updated in the user database 20 to reflect the reported usage.

As mentioned above, authorization of the user account in step 49 can take a number of different forms, such as credit based authorization, destination based authorization and class or quality of service (QoS) authorization.

Figure 5A:
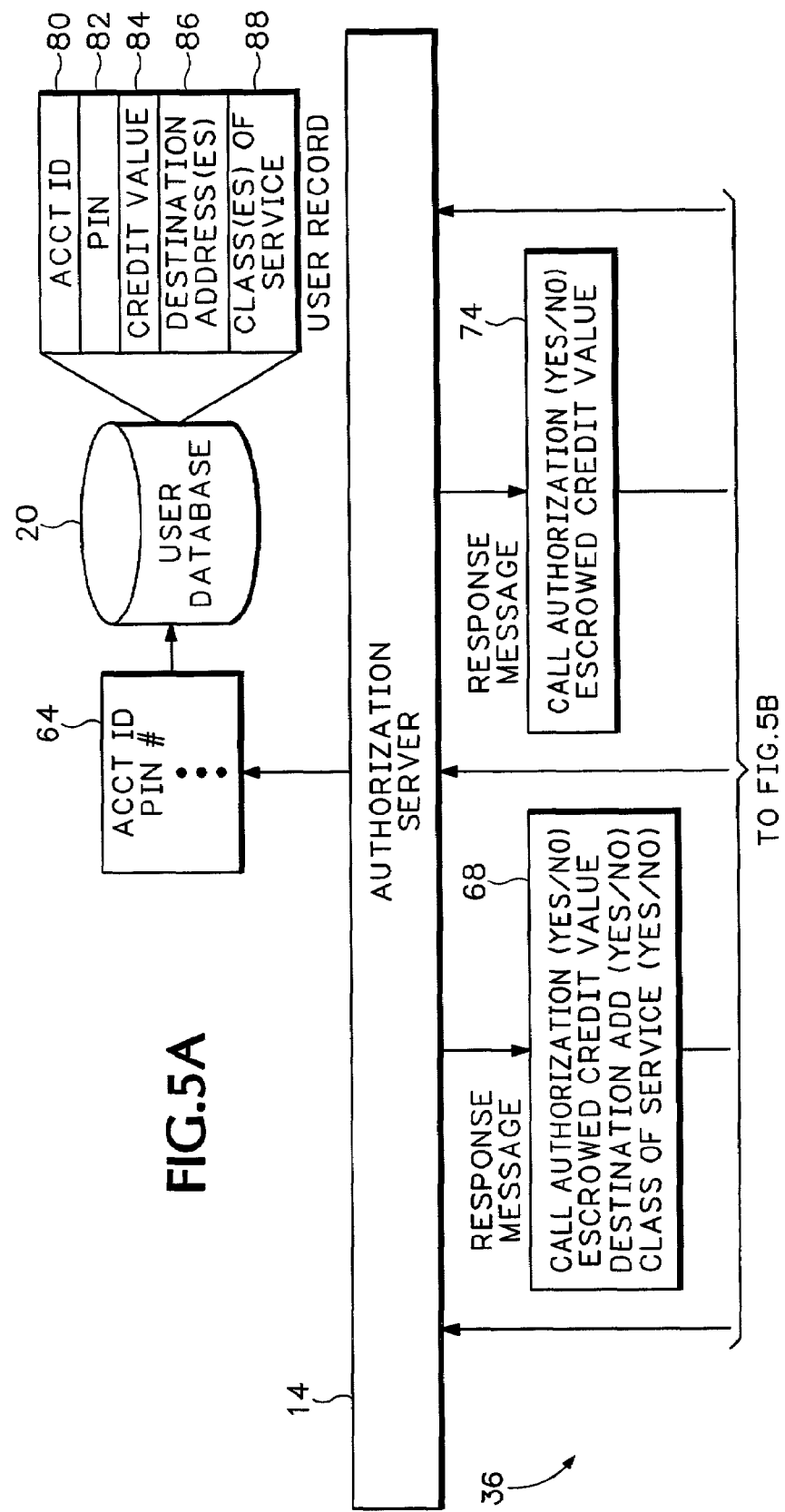
FIG. 5 is a diagram showing the different messages sent between the gateway and an authorization server during the authorization session.
Figure 5B:
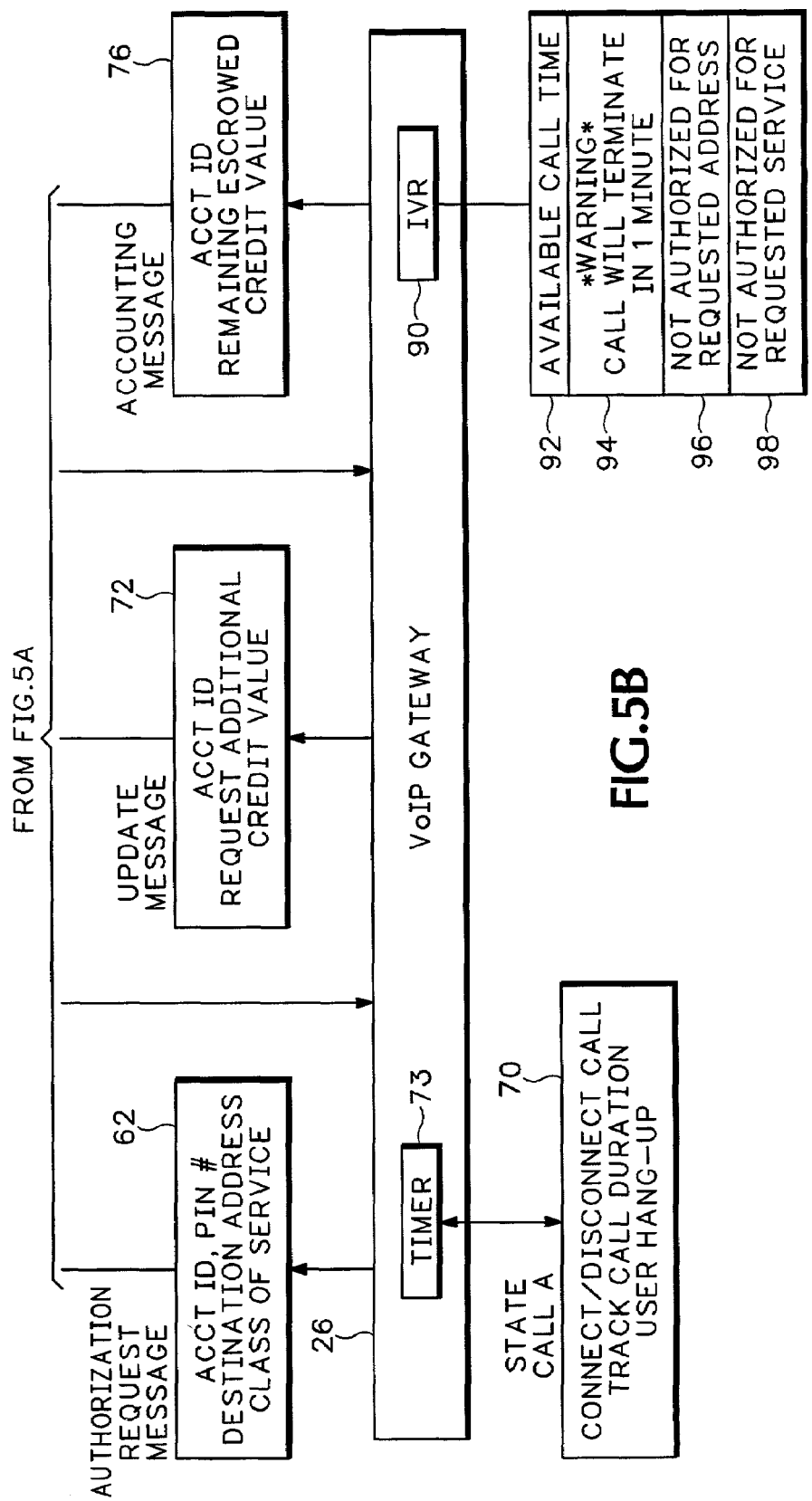

FIG. 5 shows the messages sent between the gateway 26 and the authorization server 14 during the authorization session 36 and the information that may be contained in a user record 78 in database 20.

The authorization server 14 and backend billing office 18 (FIG. 2) comprise an integrated billing system with an authorization front end. The billing system running in backend billing office 18 updates credit values according to user credit and usage. Backend billing systems are known to those skilled in the art and are, therefore, not described in further detail.

In credit based authorization, the authorization server 14 is integrated with software in the backend billing office 18 and is configured to return authorization attributes that the gateway 26 uses to track user credit real time. The backend billing office 18 has real time access to user database 20 which contains user records.

Credit Based Authorization

Credit based authorization is used to process credit based VoIP phone calls. The invention allows the gateway 26 to effectively "escrow" funds from the user account in user database 20 while the call is in progress. The authorization server 14 takes the escrow amount out of the user's debit account in the user database 20. A timer 73 then ticks down the escrow amount during the phone call. If the call terminates before the amount escrowed to the gateway 26 is used up, the remaining escrow amount is "re-credited" to the user's account.

An authorization request message 62 contains the ACCT ID, the PIN and authorization request provided by the user via the IVR application in the gateway 26. The gateway 26 sends the authorization request message 62 to the authorization server 14. The authorization server 14 then uses the user data 64 including the ACCT ID and PIN from the authorization request message 62 to access a debit account in the backend billing office 18 (FIG. 2). If the ACCT ID in the user data 64 matches the ACCT ID 80 for a user record 78 in the database 20 and the PIN matches a PIN 82 in the user record 78, an authorization response message 68 accepting the authorization request is sent back to the gateway 26.

An escrow credit value in response message 68 determines the maximum amount of time a user has for staying connected on a call. The escrowed credit value is carried back to the gateway 26 from the authorization server 14. The gateway 26 uses the credit value to determine how long the call can continue. The user is notified in a message 92 output from the IVR system 90 of the amount of available call time. The gateway 26 then establishes the call.

The gateway 26 initializes the timer 73 to the available call time. The available call time escrowed to the gateway 26 can be configured to be the sum total of all time that is available in the user debit account or a pre-determined credit unit. When the timer 73 expires, the escrowed credit value has run out. The gateway 26 can make another request to escrow funds from the user debit account or can terminate the call. The IVR 90 can be activated to play a warning message 94 to the user and provide a grace period before disconnecting the call. If a request is made to escrow additional funds, the gateway 26 sends an update message 72 to the authorization server 14. The user debit account in the database 20 is accessed again to determine if the user has acquired additional credit. If additional credit is available, more credit is escrowed in a response message 74.

If the user hangs up before the escrowed funds run out, the gateway 26 disconnects the call and sends an accounting message 76 back to the authorization server 14. The accounting message 76 identifies any remaining amount in the escrowed funds. The authorization server 14 sends the usage information in the accounting message 76 back to the billing office 18 (FIG. 2) which in turn updates the user debit account in database 20.

Destination Based Authorization

Destination based Authorization is used to authorize calls based on a specified destination address. For destination based authorization, the user record 78 in user database 20 includes one or more destination addresses 86 that a user is authorized to connect to.

The destination address requested by the user is passed from the gateway 26 to the authorization server 14 along with the user's ACCT ID and PIN in the authorization request message 62. The authorization server 14 uses the ACCT ID, PIN and destination address in the user data 64 to query the user database 20. If a user record 78 in database 20 matches the ACCT ID and PIN and contains the requested destination address, the authorization server 14 accepts the destination request. The response message 68 sent back to the gateway 26 indicates the destination address request has been accepted. The destination address 86 can be implemented as an array, a linked list, a TRIE, or other data structure of multiple address attributes to allow authorization for multiple destinations.

Based on the response message, the gateway 26 connects or terminates the call connection requested by the user. In a similar way to credit based authorization, the IVR application 90 in the gateway 26 can prompt the user for user account and connection information, as well as play out a message reporting the result of the destination address request. For example, if the user is not authorized to connect to the requested destination, the IVR 90 can play a message 96 notifying the user that a call to the requested address is not authorized.

In one example of destination based authorization, employees (i.e. users) of a company are only permitted to make calls to the number (i.e. the destination address) of company headquarters and the usage charges are billed directly to the company. User records are inserted into the user database 20 for each employee that include the employee ACCT ID and PIN. The user records in database 20 indicate the employee is permitted access only to the destination address of the company headquarters.

The destination address requested by the employee is sent from the gateway 26 to authorization server 14 in authorization request message 62. The authorization server 14 queries database 20 and finds an entry for the employee. A successful database query is reported back by the authorization server 14 to gateway 26 which, in turn, establishes the call connection. After the call disconnects, the usage information is reported from the gateway 26 to the authorization server 14 in accounting message 76 and the company account is billed.

Quality of Service Authorization

The authorization session can also be used to authorize calls based on a requested class of service or quality of service (QoS). For class based authorization, the user record 78 in user database 20 includes class(es) of service 88 that the user is permitted to use.

During authorization, the class of service requested by the user is passed from the gateway 26 to the authorization server 14 along with the user's ACCT ID and PIN in the authorization request message 62. The authorization server 14 queries user database 20 with the ACCT ID, PIN and class of service in user data 64. If a user record 78 is found in database 20 indicating that the user is authorized to connect with the requested class or service, the authorization server 14 sends back the response message 68 accepting the requested class of service.

If the user record 78 indicates that the user is not authorized for the requested class of service, the response message 68 rejects the class of service request. The class of service attribute 88 can be implemented as an array or a linked list of multiple class attributes to allow authorization of the user for multiple class values.

Based upon the acceptance or denial of the call request, the gateway 26 establishes the call for the requested class of service or terminates the call request. In a similar way to credit and destination based authorization, the IVR application in the gateway 26 prompts the user for user account and connection information, as well as plays out a message 98 notifying the user of the status for the requested class of service.

As an example of class based authorization, a user subscribes to video conferencing services. The subscriber pays a fee and is then permitted to make VoIP video conference calls. A user record is inserted into the user database 20 for the subscriber having the subscriber's ACCT ID and PIN and a class of service identifier 88 corresponding to video conferencing.

The class of service requested by the user is sent from the gateway 26 to authorization server 14 along with the ACCT ID and PIN in the authorization request message 62. The authorization server 14 finds the user record 78 in the database 20 matching the ACCT ID, PIN and requested class of service. The successful database query is reported to gateway 26 in response message 68 which enables the gateway 26 to make the video connection. After the call disconnects, the usage information associated with the video conference is reported in accounting message 76 back to the authorization server 14 for billing to the subscriber.

Other examples of classes of services are grades of voice (i.e. compression algorithm used), multi-party conferencing, call forwarding, and callerID. These services are typically based upon the use of specific infrastructure required to support the class of service.

Having described and illustrated the principles of the invention in a preferred embodiment thereof, it should be apparent that the invention can be modified in arrangement and detail without departing from such principles. For example, though the present invention is described in the context of credit, QoS and destination based authorization, it will be understood by those of ordinary skill in the art that the principles of the present invention can be applied to other authorization based calls. We claim all modifications and variations coming within the spirit and scope of the following claims.

The invention claimed is:

1. A call authorization system, comprising:
a gateway to collect authentication information including an account identification number and a personal identification number from an endpoint of a call, and to send an authorization request message to an authentication server, the authorization request requesting a response message authorizing connection of the call for the endpoint with a particular class of service, the authorization request message including an authorization request identifying the class of service associated with the call, and including the account identification number and the personal identification number, the authentication server to determine whether the endpoint is authorized to connect the call according to the class of service identified in the authorization request, and wherein the gateway is configured to connect the call through a packet-switched network and maintain authorization states for the connected call when the response message indicates the authorization request is accepted and the endpoint is authorized to make calls with the requested class of service.

2. A call authorization system according to claim 1 wherein the device is configured to send another authorization request to the authorization server during the connected call requesting additional time when a credit value is about to be used up for the connected call, and wherein the device receives a response message containing another credit value authorizing an additional amount of time for maintaining the connected call.

3. A call authorization system according to claim 2 wherein the device uses the credit value to initialize a timer for tracking a duration of the connected phone call.

4. A call authorization system according to claim 2 including sending any unused portion of the credit value back to the authorization server for crediting back to an associated user account.

5. A call authorization system according to claim 1 wherein the authorization request includes a destination address authorized for a user initiating the call and the response message authorizing the call when the destination address is authorized in the authorized server.

6. A call authorization system according to claim 1 wherein the authorization request includes a class of service indicator and the device connects the call when the class of service indicator is indicated as accepted in the response message.

7. A call authorization system according to claim 1 wherein the device tracks state information for the call including an account identifier for the call, a duration of the call, a connect status of the call, and accounting information for the call and forwards the tracked state information to the authorization server.

8. A method for authorizing calls, comprising:
sending, with an intermediate gateway, an authorization request requesting a response message authorizing connection of a call, the authorization request identifying a type of service provided in the call;
when the response message indicates the authorization request is accepted according to the identified type of service, connecting the call at least partially through a packet-switched network and maintaining authorization states for the connected call with the intermediate gateway; and
when the response message indicates the authorization request is denied according to the identified type of service, providing to an endpoint requesting the connection of the call, a denial message indicating a status for the type of service requested in the call.

9. A method according to claim 8 including
sending another authorization request during the connected call requesting additional time for maintaining the connected call when a credit value is about to be used up for the connected call; and
receiving a response message containing another credit value indicating an additional amount of time for maintaining the connected call.

10. A method according to claim 9 including using the credit value to initialize a timer for tracking duration of the connected call.

11. A method according to claim 8 including sending the destination address in the authorization request and connecting the call when the destination address is authorized in the response message.

12. A method according to claim 8 including sending a class of service indicator in the authorization request and connecting the call when the class of service indicator is accepted in the response message.

13. A method according to claim 8 including:
tracking state information for the call in the intermediate gateway, the state information including an account identifier, a duration, a connect status, and accounting information for the call; and
relaying the state information to an authorization server.

14. A system for authorizing calls, comprising:
means for sending an authorization request requesting a response message authorizing connection of a call, the authorization request identifying a type of service provided in the call;
means for connecting the call at least partially through a packet-switched network when the response message indicates the authorization request is accepted according to the identified type of service, wherein the means for connecting the call is configured to maintain authorization states for the connected call in an intermediate gateway, and wherein the means for connecting the call is configured to not connect the call when the response message indicates the authorization request is denied; and
means for providing at least one denial message to an endpoint requesting the connection of the call according to the identified type of service, where the denial message indicates a status for the type of service provided in the call.

15. A system according to claim 14 including
means for sending another authorization request during the connected call requesting additional time for maintaining the connected call when a credit value is about to be used up for the connected call; and
means for receiving a response message containing the credit value indicating an additional amount of time for maintaining the connected call.

16. A system according to claim 15 including means for using the credit value to initialize a timer for tracking duration of the connected call.

17. A system according to claim 14 including means for sending a destination address in the authorization request and connecting the call when the destination address is authorized in the response message.

18. A system according to claim 14 including means for sending a class of service indicator in the authorization request and connecting the call when the class of service indicator is accepted in the response message.

19. A system according to claim 14 including:
means for tracking state information for the call in the intermediate gateway, the state information including an account identifier, a duration, a connect status, and accounting information for the call; and
means for relaying the state information to an authorization server.

20. An article comprising a machine-accessible medium having associated data that, when accessed, results in the following:
sending, with an intermediate gateway, an authorization request requesting a response message authorizing connection of a call to an authorization device, the authorization request identifying a type of service provided in the call;
when the response message indicates the authorization request is accepted according to the identified type of service, connecting the call at least partially through a packet-switched network and maintaining authorization states for the connected call with the intermediate gateway; and
when the response message indicates the authorization request is denied according to the identified type of service, providing to an endpoint requesting the connection of the call a denial message indicating the authorization request is denied due to a lack of authorization to provide the type of service provided in the call.

21. The machine-accessible medium of claim 20 including
sending another authorization request during the connected call to the authorization device requesting additional time for maintaining the connected call when a credit value is about to be used up for the connected call; and
receiving a response message containing the credit value indicating an additional amount of time for maintaining the connected call.

22. The machine-accessible medium of claim 21 including using the credit value to initialize a timer for tracking duration of the connected call.

23. The machine-accessible medium of claim 20 including sending a destination address in the authorization request and connecting the call when the destination address is authorized in the response message.

24. The machine-accessible medium of claim 20 including sending a class of service indicator in the authorization request and connecting the call when the class of service indicator is accepted in the response message.

25. The machine-accessible medium of claim 20 including:
tracking state information for the call in the intermediate gateway, the state information including an account identifier, a duration, a connect status, and accounting information for the call; and
relaying the state information to an authorization server.

26. A call authorization system, comprising:
an authorization server configured to receive and respond to call connection authorization request messages including an authorization request identifying a type of call requested, an account identification number, and a personal identification number from intermediary gateways without monitoring the call states for connected calls, wherein the intermediary gateways are configured to maintain the call states for connected calls, and wherein the authorization server is configured to authenticate calls according to the account identification number and the personal identification number and to authorize the authenticated calls for connection by the intermediary gateways at least partially through a packet-switched network according to the authorization request identifying the type of call requested.

27. A call authorization system according to claim 26 wherein the authorization server authorizes calls according to a class of service in the authorization requests from the intermediary gateways.

28. A call authorization system according to claim 26 wherein the authorization server contains a user account and is configured to receive a request for additional connection time from one of the intermediary gateways while a call is connected and search the user account associated with the connected call for additional credit, the authorization server further configured to send a response message authorizing additional connection time for the call when additional credit exists in the associated user account.

29. A call authorization system according to claim 27 wherein the authorization server verifies a destination address for the call in the authorization request with a matching user record and sends a response message authorizing the call when the destination address is authorized.

30. A method for establishing a call in a network, comprising:
receiving, with a gateway, a call connection request message from a client, the call connection request including an authorization request, an account identification number and a personal identification number, the authorization request identifying at least one of a destination address for the call or a class of service for the call;
forwarding the call connection request message to an authorization server with the gateway, the authorization server to authorize the call according to the authorization request in the call connection request;
connecting the call to the destination address at least partially through a packet-switched network with the gateway when a response message is received authorizing the call connection request message based on the destination address or connecting the call with the class of service identified in the call connection request when the response message is received authorizing the call connection request according to the class of service;
maintaining authorization states of the connected call with the gateway;
monitoring call status information with the gateway while the call is connected; and
generating call update messages with the gateway according to the monitored call status information and sending the call update messages to the authorization server for updating a user record associated with the call.

31. A method according to claim 30 including monitoring a duration of the connected call and connecting the call for a time period corresponding with a credit value received in the response message.

32. A method according to claim 31 including requesting additional credit values to extend the call.

33. A method according to claim 32 including sending any unused portion of the credit value back to the authorization server for crediting back to an associated user account.

34. A method according to claim 30 including generating notifications to a client from time to time indicating an amount of call time available for an unused portion of the credit value.

35. A method according to claim 30 including:
sending a class of service in the call connection request; and
connecting the call through the gateway when the response message accepts the class of service.

* * * * *

UNITED STATES PATENT AND TRADEMARK OFFICE
CERTIFICATE OF CORRECTION

| | | |
|---|---|---|
| PATENT NO. | : 7,720,208 B1 | Page 1 of 1 |
| APPLICATION NO. | : 10/123603 | |
| DATED | : May 18, 2010 | |
| INVENTOR(S) | : Kia et al. | |

It is certified that error appears in the above-identified patent and that said Letters Patent is hereby corrected as shown below:

Column 9, line 26                         In Claim 8, delete "providing" and insert -- providing, --, therefor.

Signed and Sealed this
Thirty-first Day of May, 2011

David J. Kappos
*Director of the United States Patent and Trademark Office*